(12) United States Patent
Sima et al.

(10) Patent No.: US 12,051,400 B1
(45) Date of Patent: Jul. 30, 2024

(54) SYNTHETIC AUDIO OUTPUT METHOD AND APPARATUS, STORAGE MEDIUM, AND ELECTRONIC DEVICE (71) Applicant: NANJING SILICON INTELLIGENCE TECHNOLOGY CO., LTD., Jiangsu (CN)

(72) Inventors: Huapeng Sima, Jiangsu (CN); Haie Wu, Jiangsu (CN); Ao Yao, Jiangsu (CN); Da Jiang, Jiangsu (CN); Yiping Tang, Jiangsu (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/435,439

(22) Filed: Feb. 7, 2024

(30) Foreign Application Priority Data

Sep. 11, 2023 (CN) .......................... 202311160940.2

(51) Int. Cl.
*G10L 13/08* (2013.01)
*G10L 15/02* (2006.01)
*G10L 17/04* (2013.01)

(52) U.S. Cl.
CPC .............. *G10L 13/08* (2013.01); *G10L 15/02* (2013.01); *G10L 17/04* (2013.01); *G10L 2015/025* (2013.01)

(58) Field of Classification Search
CPC ....... G10L 13/00; G10L 13/08; G10L 13/033; G10L 13/02; G10L 13/047
See application file for complete search history.

(56) References Cited

U.S. PATENT DOCUMENTS 11,232,780 B1    1/2022   Iyer et al.
11,302,329 B1 *   4/2022   Sun ........................ G10L 25/51
(Continued)

FOREIGN PATENT DOCUMENTS

CN     112382270 A    2/2021
CN     112863483 A    5/2021
(Continued)

OTHER PUBLICATIONS

Jia, Ye, Yu Zhang, Ron Weiss, Quan Wang, Jonathan Shen, Fei Ren, Patrick Nguyen, Ruoming Pang, Ignacio Lopez Moreno, and Yonghui Wu. "Transfer learning from speaker verification to multispeaker text-to-speech synthesis." Advances in neural information processing systems 31 (2018). (Year: 2018).*

(Continued)

*Primary Examiner* — Mark Villena
(74) *Attorney, Agent, or Firm* — Bret E. Field; Bozicevic, Field & Francis LLP (57) ABSTRACT This application provide a synthetic audio output method and apparatus, a storage medium, and an electronic device. The method includes: inputting input text and a specified target identity identifier into an audio output model; extracting an identity feature sequence of a target identity by an identity recognition model; extracting a phoneme feature sequence corresponding to the input text by an encoding layer of a speech synthesis model; superimposing and inputting the identity feature sequence of the target identity and the phoneme feature sequence into a variable adapter of the speech synthesis model; and after duration prediction and alignment, energy prediction, and pitch prediction are performed on the phoneme feature sequence by the variable (Continued)

adapter, outputting a target Mel-frequency spectrum feature corresponding to the input text through a decoding layer of the speech synthesis model; and inputting the target Mel-frequency spectrum feature into a vocoder to output synthetic audio.

6 Claims, 3 Drawing Sheets

(56) References Cited

U.S. PATENT DOCUMENTS

| | | | |
|---|---|---|---|
| 11,410,684 B1* | 8/2022 | Klimkov | G10L 25/78 |
| 2012/0239406 A1 | 9/2012 | Langehoveen Brummer et al. | |
| 2022/0382999 A1* | 12/2022 | Gunasekara | G10L 15/142 |
| 2023/0018384 A1* | 1/2023 | Finkelstein | G10L 13/047 |

FOREIGN PATENT DOCUMENTS

| | | |
|---|---|---|
| CN | 112992156 A | 6/2021 |
| CN | 113393828 A | 9/2021 |
| CN | 115101046 A | 9/2022 |
| WO | WO2022094740 A1 | 5/2022 |
| WO | WO2023035261 A1 | 3/2023 |

OTHER PUBLICATIONS

Li, Chao, Xiaokong Ma, Bing Jiang, Xiangang Li, Xuewei Zhang, Xiao Liu, Ying Cao, Ajay Kannan, and Zhenyao Zhu. "Deep speaker: an end-to-end neural speaker embedding system." arXiv preprint arXiv:1705.02304 (2017). (Year: 2017).*

Kim, Jaehyeon, Jungil Kong, and Juhee Son. "Conditional variational autoencoder with adversarial learning for end-to-end text-to-speech." In International Conference on Machine Learning, pp. 5530-5540. PMLR, 2021. (Year: 2021).*

Guo Shaotong, End-to-end Based Multi-speaker Mandarin-English Code-switching Speech Synthesis, Department of Intelligence and Computing, Tianjin University, Dec. 2020, and its English abstract, 59 pages.

Yuan ChenHan et al., Personalized End-to-End Mandarin Speech Synthesis using Small-sized Corpus, Proceedings, APSIPA Annual Summit and Conference 2020, Dec. 2020, Auckland, New Zealand, p. 837-840.

* cited by examiner

SYNTHETIC AUDIO OUTPUT METHOD AND APPARATUS, STORAGE MEDIUM, AND ELECTRONIC DEVICE

FIELD OF THE INVENTION

The present application relates to the technical field of data processing, and in particular, to a synthetic audio output method and apparatus, a storage medium, and an electronic device.

BACKGROUND OF THE INVENTION

A text to speech (TTS) technology in a related technology is a technology for converting text into speech and outputting the speech. As a single-person TTS method becomes more and more mature, a multiple-speaker based TTS method is further promoted. Different from the single-person TTS method, speaker embedding is typically required by the multiple-speaker based TTS method to encode features of each speaker, such as voice, style, and accent, so as to distinguish between each speaker's distinctive characteristics.

A prior multi-speaker TTS model often results in synthetic speech with neutralization in speech styles in many situations (For example, if there are two speakers corresponding to a male speaker and a female speaker, respectively, ideally, the two speakers would correspond to a male vocal style and a female vocal style, respectively. Neutralization in speech styles means that the two styles interact with each other so that the final synthesized speech is neutralized).

Regarding a problem in the related technology that a multiple-speaker based speech synthesis method cannot resolve a phenomenon of speech neutralization, which results in an unsatisfactory speech synthesis effect, effective solutions have not yet been proposed.

SUMMARY OF THE INVENTION

Embodiments of the present application provide a synthetic audio output method and apparatus, a storage medium, and an electronic device, so as to resolve at least a problem in a related technology that a speech synthesis method based on multiple speakers cannot resolve a phenomenon of speech neutralization, which results in an unsatisfactory speech synthesis effect.

In an embodiment of the present application, a synthetic audio output method is provided, including: inputting input text and a specified target identity identifier into an audio output model, where the target identity identifier uniquely corresponds to a target identity, the audio output model is a neural network model trained by using sample data, and the audio output model includes an identity recognition model and a speech synthesis model; extracting an identity feature sequence of the target identity by the identity recognition model, where the identity recognition model saves an identity mapping table during training, and the identity mapping table contains mapping between an identity identifier and the identity feature sequence; extracting a phoneme feature sequence corresponding to the input text by an encoding layer of the speech synthesis model; superimposing and inputting, the identity feature sequence of the target identity and the phoneme feature sequence corresponding to the input text, into a variable adapter of the speech synthesis model; and after duration prediction and alignment, energy prediction, and pitch prediction are performed on the phoneme feature sequence by the variable adapter, performing decoding by a decoding layer of the speech synthesis model and outputting a target Mel-frequency spectrum feature corresponding to the input text, where the target Mel-frequency spectrum feature conforms to a speaking style of the target identity; and inputting the target Mel-frequency spectrum feature into a vocoder to output synthetic audio conforming to the speaking style of the target identity through the vocoder.

In an embodiment, the identity recognition model is a model constructed based on a residual network; during the training process, an input audio feature is extracted by a convolutional residual module as a main body; frame-level input is converted to a speech-level speaker feature by a feature averaging module, through linear transformation, temporarily collected speaker features are mapped by a standardization module to an identity feature sequence corresponding to an identity identifier of a speaker, and the identity recognition model is trained by a triple loss function to maximize cosine similarity between same speakers and minimize cosine similarity between different speakers.

In an embodiment, before the inputting input text and a specified target identity identifier into an audio output model, the method includes: training a preliminary model of the identity recognition model by using a first training sample, to obtain a first identity recognition model; training a preliminary model of the speech synthesis model by using a second training sample, to obtain a first speech synthesis model; and training both the first identity recognition model and the first speech synthesis model by using a third training sample, to obtain the audio output model.

In an embodiment, the training a preliminary model of the identity recognition model by using a first training sample, to obtain a first identity recognition model includes: inputting the first training sample into the preliminary model of the identity recognition model, where the first training sample includes first sample audio containing audio of multiple speakers and an identity tag corresponding to each speaker, and the preliminary model of the identity recognition model includes at least two convolutional residual modules, an averaging module, an affine module, a standardization module, and a loss function module, wherein the convolutional residual module includes a first convolution layer and a first residual layer including at least two convolution sublayers and one activation function sublayer; outputting a frame-level audio feature corresponding to first sample audio data by the convolutional residual module, performing zero centering and variance normalization on the frame-level audio feature, and then inputting the frame-level audio feature into the averaging module; averaging received data by the averaging module so that audio with a specific length corresponds to an audio feature with a specific length, and then inputting the averaged data into the affine module; performing dimensionality reduction on the received data by the affine module, and then mapping the data on which the dimensionality reduction is performed to an identity feature sequence representing an identity of the speaker by the standardization module; and verifying a difference between the identity feature sequence and the identity tag by the loss function module, and updating a model parameter of the preliminary model of the identity recognition model to obtain the first identity recognition model when the difference between the identity feature sequence and the identity tag is less than a first preset threshold through a plurality of iterations.

In an embodiment, the training a preliminary model of the speech synthesis model by using a second training sample, to obtain a first speech synthesis model includes: inputting the second training sample into the preliminary model of the speech synthesis model, where the second training sample includes second sample text and second sample audio recorded by a speaker by the second sample text as content, and the preliminary model of the speech synthesis model includes a feature encoding module, a variable adaptation module, and a feature decoding module, wherein the variable adaptation module includes a duration prediction layer, a length adjustment layer, an energy prediction layer, and a pitch prediction layer; acquiring a phoneme feature sequence corresponding to the second sample text and an audio feature sequence corresponding to second sample audio data, where the phoneme feature sequence corresponding to the second sample text is extracted by the feature encoding module, and the audio feature sequence corresponding to the second sample audio is pre-processed through a data preprocessing step; performing duration prediction on the phoneme feature sequence corresponding to the second sample text by the duration prediction layer, and comparing a result of the duration prediction with the audio feature sequence corresponding to the second sample audio data, to obtain a first loss function; inputting, into the duration prediction layer, the phoneme feature sequence corresponding to the second sample text and the audio feature sequence corresponding to the second sample audio data as first data, where, through the duration prediction layer, a low dimensional average value and a variance for the input first data are calculated to obtain second data, the second data is sampled from a latent variable space to obtain potential data, dimensionality augmentation is performed on the potential data to obtain third data, the first data is compared with the third data to obtain a second loss function, and probability distribution of the third data is compared with standard normal distribution to obtain a third loss function, where the first loss function, the second loss function, and the third loss function jointly adjust a parameter of the duration prediction layer based on a specific weight; inputting data output from the duration prediction layer into the length adjustment layer, and performing alignment based on Gaussian distribution probability during a data stretching process; inputting the audio feature sequence corresponding to the second sample audio data into the energy prediction layer and the pitch prediction layer respectively, to output an energy feature sequence and a pitch feature sequence; inputting, data output from the length adjustment layer, the energy prediction layer, and the pitch prediction layer, into the feature decoding module respectively, to output a Mel-frequency spectrum feature through the feature decoding module; and verifying a difference between the Mel-frequency spectrum feature output from the feature decoding module and the audio feature sequence corresponding to the second sample audio data through a loss function, and updating a model parameter of the preliminary model of the speech synthesis model to obtain the first speech synthesis model when the difference between the Mel-frequency spectrum feature output from the feature decoding module and the audio feature sequence corresponding to the second sample audio data is less than a second preset threshold through a plurality of iterations.

In an embodiment, the training both the first identity recognition model and the first speech synthesis model by using a third training sample, to obtain the audio output model includes: inputting the third training sample into the preliminary model of the audio output model, where the preliminary model of the audio output model includes the first identity recognition model and the first speech synthesis model, the third training sample includes third sample audio and third sample text corresponding to the third sample audio, and the third sample audio contains audio of a target identity group; extracting a phoneme feature sequence from the third sample text by the first speech synthesis model, and converting the phoneme feature sequence into a phonemic latent variable feature by a latent variable space; extracting an identity feature from each piece of the third sample audio by the first identity recognition model, and encoding an identity identifier corresponding to each identity feature to obtain an identity identifier feature; superimposing the phonemic latent variable feature, the identity feature, and the identity identifier feature to obtain a latent variable sequence, and training a variable adapter module of the first speech synthesis model by using the latent variable sequence; and verifying a difference between a Mel-frequency spectrum feature output from the first speech synthesis model and an audio feature corresponding to third sample audio data through a loss function, and updating a model parameter of the preliminary model of the audio output model to obtain the audio output model when the difference between the Mel-frequency spectrum feature output from the first speech synthesis model and the audio feature corresponding to the third sample audio data is less than a third preset threshold through a plurality of iterations.

In another embodiment of the present application, a synthetic audio output apparatus is provided, including: an input module, configured to input input text and a specified target identity identifier into an audio output model, where the target identity identifier uniquely corresponds to a target identity, the audio output model is a neural network model trained by using sample data, and the audio output model includes an identity recognition model and a speech synthesis model; a first extraction module, configured to extract an identity feature sequence of the target identity by the identity recognition model, where the identity recognition model saves an identity mapping table during training, and the identity mapping table contains mapping between an identity identifier and the identity feature sequence; a second extraction module, configured to extract a phoneme feature sequence corresponding to the input text by an encoding layer of the speech synthesis model; a processing module, configured to superimpose and input, the identity feature sequence of the target identity and the phoneme feature sequence corresponding to the input text, into a variable adapter of the speech synthesis model; after duration prediction and alignment, energy prediction, and pitch prediction are performed on the phoneme feature sequence by the variable adapter, input the phoneme feature sequence into a decoding layer of the speech synthesis model and output a target Mel-frequency spectrum feature corresponding to the input text, where the target Mel-frequency spectrum feature conforms to a speaking style of the target identity; and an output module, configured to input the target Mel-frequency spectrum feature into a vocoder to output synthetic audio conforming to the speaking style of the target identity through the vocoder.

In an embodiment of the present application, there is further provided a computer readable storage medium, in which a computer program is stored, and the computer program, while being run, is used for implementing the steps of the foregoing method embodiment.

In an embodiment of the present application, an electronic device is further provided, including a memory and a processor, where a computer program is stored in the memory, and the processor is configured to run the computer program to implement the steps of the foregoing method embodiment.

According to the synthetic audio output method provided in the embodiment of the present application, the input text and the specified target identity identifier are input into the audio output model; the identity feature sequence of the target identity is extracted by the identity recognition model; the phoneme feature sequence corresponding to the input text is extracted by the encoding layer of the speech synthesis model; the identity feature sequence of the target identity and the phoneme feature sequence corresponding to the input text are superimposed and are input into the variable adapter of the speech synthesis model; after the duration prediction, the alignment, the energy prediction, and the pitch prediction are performed on the phoneme feature sequence by the variable adapter, the target Mel-frequency spectrum feature corresponding to the input text is output from the decoding layer of the speech synthesis model; and the target Mel-frequency spectrum feature is input into the vocoder to output the synthetic audio conforming to the speaking style of the target identity through the vocoder. The following problem in the related technology is resolved: the speech synthesis method based on multiple speakers cannot resolve a phenomenon of speech neutralization, which results in an unsatisfactory speech synthesis effect. The identity mapping table is saved during the training process by the identity recognition model, and the identity mapping table contains the mapping between the identity identifier and the identity feature sequence. Therefore, during an audio synthesis process, the identity feature sequence of the target identity may be extracted by the identity recognition model. The identity feature sequence of the target identity and the phoneme feature sequence corresponding to the input text are superimposed and are input into the variable adapter of the speech synthesis model, so that after the duration prediction, the alignment, the energy prediction, and the pitch prediction are performed on the phoneme feature sequence, the target Mel-frequency spectrum feature corresponding to the input text is output from the decoding layer of the speech synthesis model. In this case, the target Mel-frequency spectrum feature conforms to the speaking style of the target identity, so that a phenomenon of speech neutralization is effectively avoided, and synthetic audio is closer to the speaking style of the target identity.

BRIEF DESCRIPTION OF THE DRAWINGS

The accompanying drawings described herein are used for further understanding of the present application, and constitute a part of the present application. The exemplary embodiments and descriptions of the present application are used for explaining the present application, and do not constitute an improper limitation to the present application. In the accompanying drawings.

DETAILED DESCRIPTION OF THE EMBODIMENTS

The present application is described below in detail with reference to the accompanying drawings and in conjunction with the embodiments. It should be noted that the embodiments in the present application as well as the features in the embodiments may be combined with each other in the case of no conflict.

It should be noted that terms "first", "second", and the like in this specification, the claims, and the accompanying drawings of the present application are intended to distinguish between similar objects, but are not necessarily intended to describe a particular sequence or a sequential order.

Figure 1:
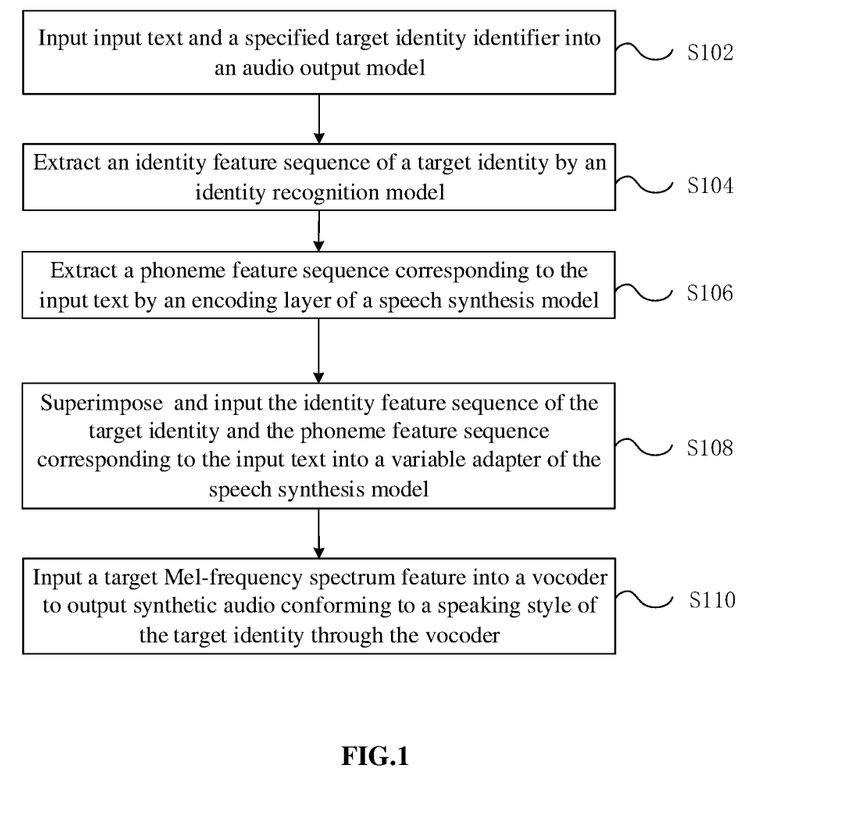
FIG. 1 is a flowchart of an optional synthetic audio output method according to an embodiment of the present application.

FIG. 1 is a flowchart of an optional synthetic audio output method according to an embodiment of the present application. As shown in FIG. 1, in this embodiment of the present application there is provided a synthetic audio output method, including the following steps.

Step S102. Input input text and a specified target identity identifier into an audio output model, where the target identity identifier uniquely corresponds to a target identity, the audio output model is a neural network model trained by using sample data, and the audio output model includes an identity recognition model and a speech synthesis model.

Step S104. Extract an identity feature sequence of the target identity by the identity recognition model, where the identity recognition model saves an identity mapping table during the training process, and the identity mapping table contains mapping between an identity identifier and the identity feature sequence.

Step S106. Extract a phoneme feature sequence corresponding to the input text by an encoding layer of the speech synthesis model.

Step S108. Superimpose and input the identity feature sequence of the target identity and the phoneme feature sequence corresponding to the input text into a variable adapter of the speech synthesis model; and after duration prediction and alignment, energy prediction, and pitch prediction are performed on the phoneme feature sequence by the variable adapter, perform decoding by a decoding layer of the speech synthesis model and output a target Mel-frequency spectrum feature corresponding to the input text, where the target Mel-frequency spectrum feature conforms to a speaking style of the target identity.

Step S110. Input the target Mel-frequency spectrum feature into a vocoder to output synthetic audio conforming to the speaking style of the target identity through the vocoder.

It should be noted that the input text may be in any languages such as Chinese, English, Korean, Japanese, or French. The encoding layer of the speech synthesis model may set different encoding manners for different languages, so as to obtain an accurate phoneme feature sequence.

It should be noted that during the training process, the identity recognition model and the speech synthesis model are first trained separately and then are trained jointly. For example, a preliminary identity recognition model may be trained first by using a large number of training samples from a universal database, and then the identity recognition model may be trained by using a training sample containing a specific identity. Similarly, a preliminary speech synthesis model may be trained first by using a large number of training samples from a universal database, and then the speech synthesis model may be trained by using a training sample containing a specific identity. When the identity recognition model and the speech synthesis model are trained by using the training samples containing the specific identities, the two models may be directly trained jointly, or may be trained separately first and then be trained jointly.

In an embodiment, the identity recognition model is a model constructed based on a residual network. During the training process, an input audio feature is extracted by a convolutional residual module as a main body. Frame-level input is converted to a speech-level speaker feature by a feature averaging module. Through linear transformation, temporarily collected speaker features are mapped by a standardization module to an identity feature sequence corresponding to an identity identifier of a speaker. The identity recognition model is trained by a triple loss function, to maximize cosine similarity between same speakers and minimize cosine similarity between different speakers.

It should be noted that the identity recognition model is the model constructed based on the residual network, where a speech expression is mapped to a hyperplane, and then similarity between speakers is calculated through the cosine similarity, so as to distinguish between characteristics of different speakers. After passing through the identity recognition model, speech is trained in combination with the speech synthesis model based on a conformer structure, so as to improve similarity between multi-speaker speech and a real speaker.

Figure 2:
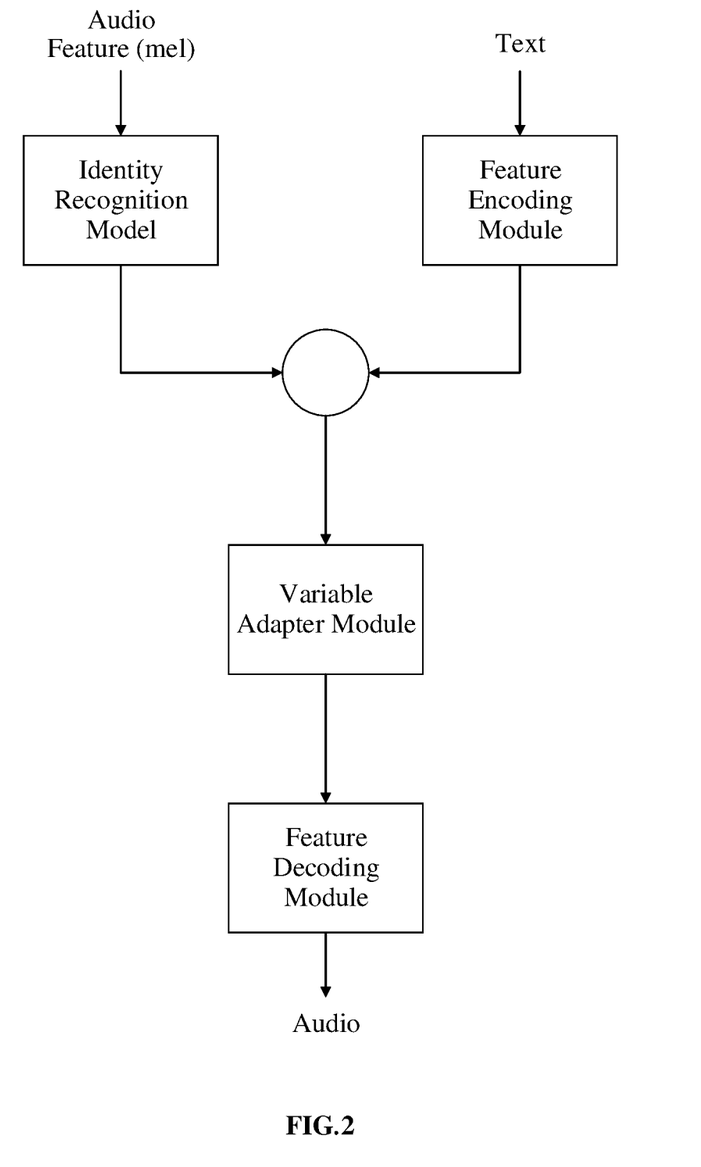
FIG. 2 is a schematic diagram of a structure of an optional audio output model according to an embodiment of the present application.

FIG. 2 is a schematic diagram of a structure of an optional audio output model according to an embodiment of the present application. As shown in FIG. 2, in an embodiment, before inputting the input text and the specified target identity identifier into the audio output model, the method includes: training a preliminary model of the identity recognition model by using a first training sample, to obtain a first identity recognition model; training a preliminary model of the speech synthesis model by using a second training sample, to obtain a first speech synthesis model; and training both the first identity recognition model and the first speech synthesis model by using a third training sample, to obtain the audio output model.

It should be noted that the first training sample and the second training sample are obtained from a universal database; and the third training sample is data containing audio of a target identity group. The first training sample contains a large amount of speech data from speakers, so that the trained first identity recognition model has a generalization function. In this way, identity identifiers of different speakers may be effectively identified, and corresponding identity feature sequences may be matched, so that corresponding speaking styles are matched.

In an embodiment, the training a preliminary model of the identity recognition model by using a first training sample, to obtain a first identity recognition model includes: inputting the first training sample into the preliminary model of the identity recognition model, where the first training sample includes first sample audio containing audio of multiple speakers and an identity tag corresponding to each speaker, and the preliminary model of the identity recognition model includes at least two convolutional residual modules, an averaging module, an affine module, a standardization module, and a loss function module, wherein the convolutional residual module includes a first convolution layer and a first residual layer including at least four convolution sublayers and one activation function sublayer; outputting a frame-level audio feature corresponding to first sample audio data by the convolutional residual module, performing zero centering and variance normalization on the frame-level audio feature, and then inputting the frame-level audio feature into the averaging module; averaging received data by the averaging module so that audio with a specific length corresponds to an audio feature with a specific length, and then inputting the averaged data into the affine module; performing dimensionality reduction on the received data by the affine module, and then mapping the data on which the dimensionality reduction is performed to an identity feature sequence representing an identity of the speaker by the standardization module; and verifying a difference between the identity feature sequence and the identity tag by the loss function module, updating a model parameter of the preliminary model of the identity recognition model to obtain the first identity recognition model when the difference between the identity feature sequence and the identity tag is less than a first preset threshold through a plurality of iterations.

It should be noted that the convolutional residual module includes mainly a first convolution layer CNN and a first residual layer Res. There may be 2, 3, 4, or even more convolutional residual modules, where a larger number of the convolutional residual modules indicates a better training result. Three or five convolutional residual modules are preferentially used in the embodiments of the present application. The first residual layer Res may be formed by stacking 2 to 4 residual blocks, and each residual block includes 2 to 4 3*3 convolution submayers (with a stride of 1) and one Relu activation function. The convolutional residual module is mainly configured to extract a speech frame-level feature that is related to the speaker. For example, a 64-dimensional mfcc feature may be extracted, on which zero centering and variance normalization are performed.

It should be noted that, relevant processing involved in extracting the speech frame-level feature by the convolutional residual module may include: determining a number of preset Gaussian components; and preprocessing data in an identity recognition dataset based on the number of the preset Gaussian components, to generate Gaussian components of data in the identity recognition dataset. Information about each of the Gaussian components includes weight information, vector information, and a covariance matrix.

Specifically, for initialization processing during a training process of the first identity recognition model, M=2048 Gaussian component assemblies may be set, that is, 2048 single Gaussian components are generated. Each i component (i=1, 2, . . . , or M) includes a weight, a mean vector, and a covariance matrix: $\lambda=\{c_i, \mu_i, \Sigma_i\}$, where $\mu_i$ and $\Sigma_i$ represent a vector and a matrix, respectively.

Information extraction for the Gaussian component refers to describing a feature sequence, such as an MFCC feature sequence, of speech data by statistics. The extracted statistics are high-dimensional features, and are then projected onto a low dimensional space to obtain identity parameter vectors. In practical applications, the identity parameter vectors represent identity information of different speakers.

The averaging module is configured to perform an averaging operation on a speech feature, and mainly functions to average speech frame features from the convolutional residual module, so that a segment of speech corresponds to a segment of feature, rather than that each frame of speech corresponds to a segment of feature. Mainly, dimension reduction and normalization are performed to reduce computational complexity. Because a segment of speech has a large number, that is, N, of frames, and each frame corresponds to a 66-dimensional feature, a small segment of speech may have N*66 dimensions, resulting in high computational complexity and a slow training speed. The affine module is used for transformation between feature dimensions, for example, changing a 2048-dimensional feature to a 512-dimensional feature. In this way, dimensions are reduced, so that computational complexity is reduced, and a number of model parameters is reduced, thereby avoiding a situation where training is difficult to converge. The standardization module standardizes the dimensionality-reduced feature to be mapped into a vector representing speech of a speaker, that is, an identity feature sequence representing an identity of the speaker.

It should be noted that, the loss function module is used to verify the difference between the identity feature sequence and the identity tag, and update the model parameter of the preliminary model of the identity recognition model. In this embodiment of the present application, a loss function for training the identity recognition model is a triple loss function. Three sample examples are input into the identity recognition model at the same time, where there is an anchor point (an expression "M" spoken by a specific speaker A), a positive example (another expression P spoken by the same speaker A), and a negative example (an expression "N" spoken by another speaker B). The expression spoken by B may be the same as or different from the expression spoken by A. Cosine similarity between the anchor point and the positive and negative examples is continuously updated, so that the cosine similarity between same speakers is maximized while the cosine similarity between different speakers is minimized. Through a plurality of iterations, the first identity recognition model is obtained when the difference between the identity feature sequence and the identity tag is less than the first preset threshold. The cosine similarity is calculated based on a prior formula cosine_similarity ( ), with two values to be compared (three sample examples are compared pairwise) as inputs, such as M and N herein, and an output corresponding to an identity tag of A.

In an embodiment, the training a preliminary model of the speech synthesis model by using a second training sample, to obtain a first speech synthesis model includes: inputting the second training sample into the preliminary model of the speech synthesis model, where the second training sample includes second sample text and second sample audio recorded by a speaker by the second sample text as content, and the preliminary model of the speech synthesis model includes a feature encoding module, a variable adaptation module, and a feature decoding module, wherein the variable adaptation module includes a duration prediction layer, a length adjustment layer, an energy prediction layer, and a pitch prediction layer; acquiring a phoneme feature sequence corresponding to the second sample text and an audio feature sequence corresponding to second sample audio data, where the phoneme feature sequence corresponding to the second sample text is extracted by the feature encoding module, and the audio feature sequence corresponding to the second sample audio is pre-processed through a data preprocessing step; performing duration prediction on the phoneme feature sequence corresponding to the second sample text by the duration prediction layer, and comparing a result of the duration prediction with the audio feature sequence corresponding to the second sample audio data, to obtain a first loss function; inputting, into the duration prediction layer, the phoneme feature sequence corresponding to the second sample text and the audio feature sequence corresponding to the second sample audio data as first data, where, through the duration prediction layer, a low dimensional average value and a variance for the input first data are calculated to obtain second data, the second data is sampled from a latent variable space to obtain potential data, dimensionality augmentation is performed on the potential data to obtain third data, the first data is compared with the third data to obtain a second loss function, and probability distribution of the third data is compared with standard normal distribution to obtain a third loss function, where the first loss function, the second loss function, and the third loss function jointly adjust a parameter of the duration prediction layer based on a specific weight; inputting data output from the duration prediction layer into the length adjustment layer, and performing alignment based on Gaussian distribution probability during a data stretching process; inputting the audio feature sequence corresponding to the second sample audio data into the energy prediction layer and the pitch prediction layer respectively, to output an energy feature sequence and a pitch feature sequence; inputting data output from the length adjustment layer, the energy prediction layer, and the pitch prediction layer into the feature decoding module respectively, to output a Mel-frequency spectrum feature through the feature decoding module; and verifying a difference between the Mel-frequency spectrum feature output from the feature decoding module and the audio feature sequence corresponding to the second sample audio data through a loss function, updating a model parameter of the preliminary model of the speech synthesis model to obtain the first speech synthesis model, through a plurality of iterations, when the difference between the Mel-frequency spectrum feature output from the feature decoding module and the audio feature sequence corresponding to the second sample audio data is less than a second preset threshold.

It should be noted that the audio feature sequence corresponding to the second sample audio is pre-processed through a data preprocessing step. The data preprocessing step mainly includes extracting the following features for training of audio: a Mel spectrum, pitch, energy, and a duration prediction.

It should be noted that the phoneme feature sequence corresponding to the second sample text is extracted by the feature encoding module. The feature encoding module encodes phonemes in training data into a phoneme vector, and adds location code to express correlation between the phonemes and information about locations of the phonemes.

It should be noted that the variable adapter may additionally introduce different acoustic feature information, such as fundamental frequency (pitch), duration, and energy, to control quality of synthetic speech. In phonetics, a duration of the phoneme directly affects articulation duration and overall prosody; the fundamental frequency is another feature that affects emotions and prosodies; and the energy affects amplitude of the spectrum and directly affects volume of audio. Therefore, introduction of the three variables may improve the quality of the synthetic audio. A length of the Mel spectrum of the audio is significantly longer than that of an input phoneme, and the two lengths need to be made equal for output. Therefore, the length adjustment layer is required to extend a length of encoder output to a spectrum length by duration information. Length extension may be implemented by performing upsampling directly mainly based on a specific value of the duration.

It should be noted that a duration prediction unit is configured to perform duration prediction on the sample text. The duration is used to control prosodies and rhythms of the synthetic speech, such as a rhythm and a speed of speech, which may make the synthetic speech more natural. The duration prediction unit further includes an MFA (Montreal Forced Aligner) subunit and a variational automatic encoding subunit, wherein the two subunits are independent of each other.

The MFA subunit is configured to perform duration prediction on a phoneme sequence output from the feature encoding module, and compare a result of the duration prediction with duration of the sample audio to obtain the first loss function.

The variational automatic encoding subunit is configured to perform auto-encoding on text and audio in a sample, obtain new data by performing auto-encoding on the feature, and compare audio obtained through auto-encoding with the sample audio to obtain the second loss function. Core content of the variational automatic encoding subunit is to calculate the loss function by using a potential feature. A working principle of the variational automatic encoding subunit is described below.

The variational automatic encoding subunit includes an encoder part and a decoder part. The encoder part is configured to calculate a low dimensional (about hundreds of dimensions) average value and a variance for input data X (a feature obtained by concatenating a phoneme feature and an audio feature, which is equivalent to the first data), and further perform sampling processing on X from the latent variable space by the low dimensional average value and the variance (to obtain the second data) to obtain potential data Z (equivalent to the potential data) corresponding to the input data. The decoder part is configured to generate new data Y (equivalent to third data) after dimensionality augmentation is performed based on the foregoing potential data Z. A principle of the variational automatic encoding subunit is to sample according to probability distribution of the input data X to obtain the potential data Z, and further generate new data Y that is different from the original input data X but follows the probability distribution of the input data X. In this way, in the process of speech synthesis, although a number of samples is small, probability distribution of sample data may be obtained through the foregoing auto-encoding process, thereby achieving a better training result.

During the foregoing sampling process of the latent variable space, to ensure that probability distribution of the potential data Z conforms to that of the input data X, it may be assumed first that there is a posterior probability of Z with respect to X, and further assume that posterior probability distribution conforms to normal distribution. Anterior probability of Z with respect to X is calculated by using the posterior probability distribution, so that probability distribution of Z may be made conform to that of the input data X.

For the second loss function, there are two parts. One part is used to calculate similarity between generated data Y and the original data X, and the other part is used to calculate a difference between probability distribution of the output data Y and the standard normal distribution.

The first loss function of the foregoing MFA subunit and the second loss function of the variational automatic encoding subunit together constitute the loss function of the duration prediction layer in the embodiments of the present application. Outputs of the foregoing MFA subunit and the variational automatic encoding subunit are all input into the length adjustment layer for processing.

In an embodiment, the training both the first identity recognition model and the first speech synthesis model by using a third training sample, to obtain the audio output model includes: inputting the third training sample into the preliminary model of the audio output model, where the preliminary model of the audio output model includes the first identity recognition model and the first speech synthesis model, the third training sample includes third sample audio and third sample text corresponding to the third sample audio, and the third sample audio contains audio of a target identity group; extracting a phoneme feature sequence from the third sample text by the first speech synthesis model, and converting the phoneme feature sequence into a phonemic latent variable feature by a latent variable space; extracting an identity feature from each piece of the third sample audio by the first identity recognition model, and encoding an identity identifier corresponding to each identity feature to obtain an identity identifier feature; superimposing the phonemic latent variable feature, the identity feature, and the identity identifier feature to obtain a latent variable sequence, and training a variable adapter module of the first speech synthesis model by using the latent variable sequence; and verifying a difference between a Mel-frequency spectrum feature output from the first speech synthesis model and an audio feature corresponding to third sample audio data through a loss function, and updating a model parameter of the preliminary model of the audio output model to obtain the audio output model when the difference between the Mel-frequency spectrum feature output from the first speech synthesis model and the audio feature corresponding to the third sample audio data is less than a third preset threshold through a plurality of iterations.

It should be noted that during joint training, training text is first passed through the feature encoding module in the first speech synthesis model to obtain the phone feature sequence; and meanwhile, each identity feature sequence of the training data is extracted by the trained first identity recognition model. Identities of multiple speakers are all encoded to obtain an identity identifier feature sequence; and meanwhile, a fundamental frequency feature, a duration feature, and an energy feature are extracted from audio data, and these three features are merged and superimposed with the phoneme feature sequence, the identity feature sequence, and the identity identifier feature sequence to obtain a latent variable with timbre of the speaker. Subsequently, the latent variable is input into the variable adapter module for training. Finally, adapted latent variables generated by the variable adapter module are parallelly converted into Mel-frequency spectrum features by the decoder.

In specific application, the input text and the specified target identity identifier are input into the audio output model. After the target Mel-frequency spectrum feature is output from the decoder, the synthetic audio conforming to the speaking style of the target identity may be output from the vocoder.

Figure 3:
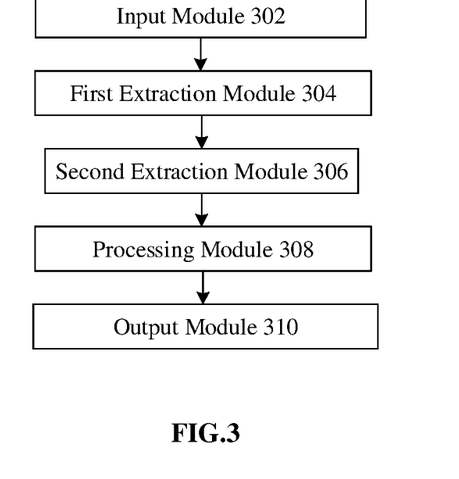
FIG. 3 is a schematic diagram of a structure of an optional synthetic audio output apparatus according to an embodiment of the present application.

In another embodiment of the present application, there is further provided a synthetic audio output apparatus, which is configured to implement any one of the foregoing method steps. Solutions that have been stated are not repeated herein. As shown in FIG. 3, the synthetic audio output apparatus includes:

an input module 302, configured to input input text and a specified target identity identifier into an audio output model, where the target identity identifier uniquely corresponds to a target identity, the audio output model is a neural network model trained by using sample data, and the audio output model includes an identity recognition model and a speech synthesis model;

a first extraction module 304, configured to extract an identity feature sequence of the target identity by the identity recognition model, where the identity recognition model saves an identity mapping table during the training process, and the identity mapping table contains mapping between an identity identifier and the identity feature sequence;

a second extraction module 306, configured to extract a phoneme feature sequence corresponding to the input text by an encoding layer of the speech synthesis model;

a processing module 308, configured to superimpose and input the identity feature sequence of the target identity and the phoneme feature sequence corresponding to the input text into a variable adapter of the speech synthesis model; and after duration prediction and alignment, energy prediction, and pitch prediction are performed on the phoneme feature sequence by the variable adapter, input the phoneme feature sequence into a decoding layer of the speech synthesis model and output a target Mel-frequency spectrum feature corresponding to the input text, where the target Mel-frequency spectrum feature conforms to a speaking style of the target identity; and an output module 310, configured to input the target Mel-frequency spectrum feature into a vocoder to output synthetic audio conforming to the speaking style of the target identity through the vocoder.

The audio output model provided in this embodiment of the present application may generate a universal model after being trained with first sample data and second sample data. During use, a user just needs to provide small sample data of 10-20 minutes to complete training for a model containing the targeted target identity. Through application of both a variational automatic encoding subunit and an MFA subunit, a relatively ideal training effect may be achieved based on the foregoing small sample data of 10-20 minutes.

Figure 4:
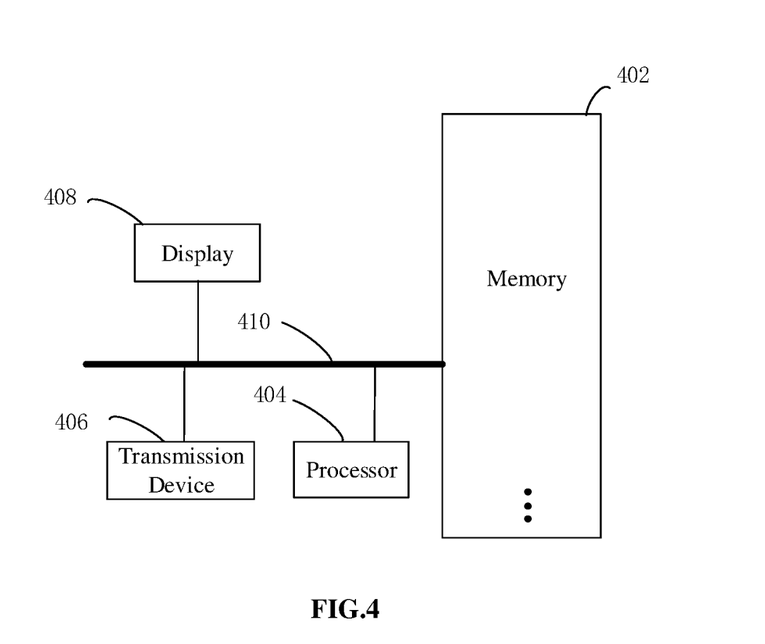
FIG. 4 is a schematic diagram of a structure of an optional electronic device according to an embodiment of the present application.

According to still another aspect of an embodiment of the present application, there is further provided an electronic device for implementing the foregoing synthetic audio output method. The electronic device may be, but is not limited to be applied to a server. As shown in FIG. 4, the electronic device includes a memory 402 and a processor 404. The memory 402 stores a computer program. The processor 404 is configured to perform the steps in any one of the foregoing method embodiments through the computer program.

Optionally, in this embodiment, the electronic device may be located in at least one of a plurality of network devices in a computer network.

Optionally, in this embodiment, the processor may be configured to perform the following steps through the computer program.

S1. Acquire a first audio feature and a first image feature, where the first audio feature is a speech data feature of a first object, and the first image feature is an image sequence containing a mouth image of a target object.

S2. Input the first audio feature and the first image feature into a trained audio-driven lip-sync network model, where the audio-driven lip-sync network model is a model obtained by training a preliminary audio-driven lip-sync network model by using sample video data and a sample lip-sync image.

S3. Concatenate the first audio feature and the first image feature, and then perform convolutional encoding and deep learning sequentially, to obtain a second image feature.

S4. Based on a feature extraction method and a sub-pixel convolution method, convert the second image feature with first resolution into a target image feature with second resolution through convolution and recombination of multiple channels, where the first resolution is smaller than the second resolution.

S5. Perform deconvolutional encoding on the target image feature to output a lip-sync image of the target object corresponding to the first audio feature.

Optionally, a person skilled in the art may understand that the structure shown in FIG. 4 is just for exemplification, and the electronic device may also be a terminal device such as a smart phone (such as an Android phone or an iOS phone), a tablet computer, a palmtop computer, a mobile Internet device (MID), or a PAD. FIG. 4 does not constitute a limitation on a structure of the foregoing electronic device. For example, the electronic device may further include more or less components (such as a network interface) than those shown in FIG. 4, or may have a configuration different from that shown in FIG. 4.

The memory 402 may be configured to store software programs and modules, such as program instructions/modules corresponding to the synthetic audio output method and apparatus in the embodiments of the present application. The processor 404 runs the software programs and the modules that are stored in the memory 402 to implement various function applications and data processing, that is, to implement the foregoing synthetic audio output method. The memory 402 may include a high-speed random access memory, and may further include a non-volatile memory, such as one or more magnetic storage devices, a flash memory, or another non-volatile solid-state memory. In some embodiments, the memory 402 may further include memories remotely disposed with respect to the processor 404, and these remote memories may be connected to the mobile terminal through a network. Examples of the foregoing network include, but are not limited to the Internet, an intranet, a local area network, a mobile communications network, and a combination thereof. The memory 402 may be specifically, but is not limited to be configured to store program steps of a speech separation method.

Optionally, a transmission device 406 is configured to receive or transmit data through a network. Specific examples of the foregoing network may include a wired network and a wireless network. In an example, the transmission device 406 includes a network adapter (network interface controller, NIC), which may be connected to another network device and router through a network cable, to communicate with the Internet or a local area network. In an example, the transmission device 406 is a radio frequency (RF) module, and is configured to communicate with the Internet in a wireless manner.

In addition, the electronic device further includes: a display 408, configured to display a process of outputting synthetic audio; and a connection bus 410, configured to connect various module components in the electronic device.

An embodiment of the present application further provides a computer readable storage medium, in which a computer program is stored, and the computer program is configured to implement the steps in any one of the foregoing method embodiments while being run.

Optionally, in this embodiment, the storage medium may be configured to store the computer program that is configured to perform following steps.

S1. Acquire a first audio feature and a first image feature, where the first audio feature is a speech data feature of a first object, and the first image feature is an image sequence containing a mouth image of a target object.

S2. Input the first audio feature and the first image feature into a trained audio-driven lip-sync network model, where the audio-driven lip-sync network model is a model obtained by training a preliminary audio-driven lip-sync network model by using sample video data and a sample lip-sync image.

S3. Concatenate the first audio feature and the first image feature, and then perform convolutional encoding and deep learning sequentially, to obtain a second image feature.

S4. Based on a feature extraction method and a sub-pixel convolution method, convert the second image feature with first resolution into a target image feature with second resolution through convolution and recombination of multiple channels, where the first resolution is smaller than the second resolution.

S5. Perform deconvolutional encoding on the target image feature to output a lip-sync image of the target object corresponding to the first audio feature.

A real-time audio-driven lip-sync system in an embodiment of the present application focuses on a back-end algorithm, and does not involve any execution bodies other than a server or a terminal device for computing and processing during an implementation process, but only involves a video acquisition device, an audio receiving device, a video display device, and the like that are commonly used in the art at information collection and display stages.

Serial numbers for the foregoing embodiments of the present application are just for description, and do not represent superiority or inferiority of the embodiments.

If an integrated unit in the foregoing embodiment is implemented in a form of a software functional unit and is sold or used as an independent product, the integrated unit may be stored in the foregoing computer readable storage medium. On the basis of such understanding, the technical solutions of the present application essentially, or parts of the technical solutions of the present application that attribute to the prior art, or all or part of the technical solutions may be represented in the form of software products. A computer software product may be stored in a storage medium, and includes a plurality of instructions to enable one or more computer devices (which may be a personal computer, a server, or a network device) to implement all or some steps of the method in all embodiments of the present application.

In the foregoing embodiments of the present application, the description of each embodiment has its own focus. For a part that is not described in detail in an embodiment, reference may be made to related descriptions of other embodiments.

In the embodiments provided in the present application, it should be understood that the disclosed client may be implemented in other manners. For example, the device embodiments described above are merely exemplary. For example, the division of units is only a division of logical functions. In actual implementations, there may be other division manners. For example, a plurality of units or components may be combined or may be integrated into another system, or some features may be ignored or not implemented. In addition, the displayed or discussed mutual coupling or direct coupling or communication connection may be indirect coupling or communication connections through some interfaces, units, or modules, and may be in electrical or other forms.

The units described as separated parts may be or may not be physically separated; and parts displayed as units may be or may not be physical unit, that is, may be located at one place or may be distributed on a plurality of network units. Some or all of the units may be selected according to actual requirements to achieve the objectives of the solutions of the embodiments.

In addition, all functional units in the embodiments of the present application may be integrated into one processing unit, or each unit may exist alone physically, or two or more units may be integrated into one unit. The foregoing integrated unit may be implemented in a form of hardware, or may be implemented in a form of a software function unit.

Merely preferred implementations of the present application are described above. It should be noted that for persons of ordinary skills in the art, improvements and modifications may be made without departing from the principles of the present application, and these improvements and modifications should also be considered as being subject to the protection scope of the present application.

What is claimed is:

1. A synthetic audio output method, comprising:
inputting input text and a specified target identity identifier into an audio output model, wherein the target identity identifier uniquely corresponds to a target identity, the audio output model is a neural network model trained by using sample data, and the audio output model comprises an identity recognition model and a speech synthesis model;
extracting an identity feature sequence of the target identity by the identity recognition model, wherein the identity recognition model saves an identity mapping table during training, and the identity mapping table contains mapping between an identity identifier and the identity feature sequence;
extracting a phoneme feature sequence corresponding to the input text by an encoding layer of the speech synthesis model;
superimposing and inputting, the identity feature sequence of the target identity and the phoneme feature sequence corresponding to the input text, into a variable adapter of the speech synthesis model; and after duration prediction and alignment, energy prediction, and pitch prediction are performed on the phoneme feature sequence by the variable adapter, performing decoding by a decoding layer of the speech synthesis model and outputting a target Mel-frequency spectrum feature corresponding to the input text, wherein the target Mel-frequency spectrum feature conforms to a speaking style of the target identity; and
inputting the target Mel-frequency spectrum feature into a vocoder to output synthetic audio conforming to the speaking style of the target identity through the vocoder,
wherein before the inputting input text and a specified target identity identifier into an audio output model, the method comprises:
training a preliminary model of the identity recognition model by using a first training sample, to obtain a first identity recognition model;

training a preliminary model of the speech synthesis model by using a second training sample, to obtain a first speech synthesis model; and training both the first identity recognition model and the first speech synthesis model by using a third training sample, to obtain the audio output model, wherein the training a preliminary model of the speech synthesis model by using a second training sample, to obtain a first speech synthesis model comprises:

inputting the second training sample into the preliminary model of the speech synthesis model, wherein the second training sample comprises second sample text and second sample audio recorded by a speaker by the second sample text as content, and the preliminary model of the speech synthesis model comprises a feature encoding module, a variable adaptation module, and a feature decoding module, wherein the variable adaptation module comprises a duration prediction layer, a length adjustment layer, an energy prediction layer, and a pitch prediction layer;

acquiring a phoneme feature sequence corresponding to the second sample text and an audio feature sequence corresponding to second sample audio data, wherein the phoneme feature sequence corresponding to the second sample text is extracted by the feature encoding module, and the audio feature sequence corresponding to the second sample audio is pre-processed through a data preprocessing step;

performing duration prediction on the phoneme feature sequence corresponding to the second sample text by the duration prediction layer, and comparing a result of the duration prediction with the audio feature sequence corresponding to the second sample audio data, to obtain a first loss function;

inputting, into the duration prediction layer, the phoneme feature sequence corresponding to the second sample text and the audio feature sequence corresponding to the second sample audio data as first data, wherein, through the duration prediction layer, a low dimensional average value and a variance for the input first data are calculated to obtain second data, the second data is sampled from a latent variable space to obtain potential data, dimensionality augmentation is performed on the potential data to obtain third data, the first data is compared with the third data to obtain a second loss function, and probability distribution of the third data is compared with standard normal distribution to obtain a third loss function, wherein the first loss function, the second loss function, and the third loss function jointly adjust a parameter of the duration prediction layer based on a specific weight;

inputting data output from the duration prediction layer into the length adjustment layer, and performing alignment based on Gaussian distribution probability during a data stretching process;

inputting the audio feature sequence corresponding to the second sample audio data into the energy prediction layer and the pitch prediction layer respectively, to output an energy feature sequence and a pitch feature sequence;

superimposing data output from the length adjustment layer, the energy prediction layer, and the pitch prediction layer, and then inputting the data into the feature decoding module to output a Mel-frequency spectrum feature through the feature decoding module; and verifying a difference between the Mel-frequency spectrum feature output from the feature decoding module and the audio feature sequence corresponding to the second sample audio data through a loss function, and updating a model parameter of the preliminary model of the speech synthesis model to obtain the first speech synthesis model when the difference between the Mel-frequency spectrum feature output from the feature decoding module and the audio feature sequence corresponding to the second sample audio data is less than a second preset threshold through a plurality of iterations.

2. The synthetic audio output method according to claim 1, wherein the identity recognition model is a model constructed based on a residual network; during the training, an input audio feature is extracted by a convolutional residual module as a main body, frame-level input is converted to a speech-level speaker feature by a feature averaging module, through linear transformation, temporarily collected speaker features are mapped by a standardization module to an identity feature sequence corresponding to an identity identifier of a speaker, and the identity recognition model is trained by a triple loss function to maximize cosine similarity between same speakers and minimize cosine similarity between different speakers.

3. The synthetic audio output method according to claim 1, wherein the training a preliminary model of the identity recognition model by using a first training sample, to obtain a first identity recognition model comprises:

inputting the first training sample into the preliminary model of the identity recognition model, wherein the first training sample comprises first sample audio containing audio of multiple speakers and an identity tag corresponding to each speaker, and the preliminary model of the identity recognition model comprises at least two convolutional residual modules, an averaging module, an affine module, a standardization module, and a loss function module, wherein the convolutional residual module includes a first convolution layer and a first residual layer including at least four convolution sublayers and one activation function sublayer;

outputting a frame-level audio feature corresponding to first sample audio data by the convolutional residual module, performing zero centering and variance normalization on the frame-level audio feature, and then inputting the frame-level audio feature into the averaging module;

averaging received data by the averaging module so that audio with a specific length corresponds to an audio feature with a specific length, and then inputting the averaged data into the affine module;

performing dimensionality reduction on the received data by the affine module, and then mapping the data on which the dimensionality reduction is performed to an identity feature sequence representing an identity of the speaker by the standardization module; and verifying a difference between the identity feature sequence and the identity tag by the loss function module, and updating a model parameter of the preliminary model of the identity recognition model to obtain the first identity recognition model when the difference between the identity feature sequence and the identity tag is less than a first preset threshold through a plurality of iterations.

4. The synthetic audio output method according to claim 1, wherein the training both the first identity recognition model and the first speech synthesis model by using a third training sample, to obtain the audio output model comprises:
inputting the third training sample into the preliminary model of the audio output model, wherein the preliminary model of the audio output model comprises the first identity recognition model and the first speech synthesis model, the third training sample comprises third sample audio and third sample text corresponding to the third sample audio, and the third sample audio contains audio of a target identity group;
extracting a phoneme feature sequence from the third sample text by the first speech synthesis model, and converting the phoneme feature sequence into a phonemic latent variable feature by a latent variable space;
extracting an identity feature from each piece of the third sample audio by the first identity recognition model, and encoding an identity identifier corresponding to each identity feature to obtain an identity identifier feature;
superimposing the phonemic latent variable feature, the identity feature and the identity identifier feature, and a fundamental frequency feature, a duration feature and an energy feature corresponding to the third sample audio to obtain a latent variable sequence, and training a variable adapter module of the first speech synthesis model by using the latent variable sequence; and
verifying a difference between a Mel-frequency spectrum feature output from the first speech synthesis model and an audio feature corresponding to third sample audio data through a loss function, and updating a model parameter of the preliminary model of the audio output model to obtain the audio output model when the difference between the Mel-frequency spectrum feature output from the first speech synthesis model and the audio feature corresponding to the third sample audio data is less than a third preset threshold through a plurality of iterations.

5. A non-transitory computer readable storage medium, in which a computer program is stored, and the computer program is configured to implement a synthetic audio output method while being run,
wherein the synthetic audio output method comprises:
inputting input text and a specified target identity identifier into an audio output model, wherein the target identity identifier uniquely corresponds to a target identity, the audio output model is a neural network model trained by using sample data, and the audio output model comprises an identity recognition model and a speech synthesis model;
extracting an identity feature sequence of the target identity by the identity recognition model, wherein the identity recognition model saves an identity mapping table during training, and the identity mapping table contains mapping between an identity identifier and the identity feature sequence;
extracting a phoneme feature sequence corresponding to the input text by an encoding layer of the speech synthesis model;
superimposing and inputting, the identity feature sequence of the target identity and the phoneme feature sequence corresponding to the input text, into a variable adapter of the speech synthesis model; and after duration prediction and alignment, energy prediction, and pitch prediction are performed on the phoneme feature sequence by the variable adapter, performing decoding by a decoding layer of the speech synthesis model and outputting a target Mel-frequency spectrum feature corresponding to the input text, wherein the target Mel-frequency spectrum feature conforms to a speaking style of the target identity; and
inputting the target Mel-frequency spectrum feature into a vocoder to output synthetic audio conforming to the speaking style of the target identity through the vocoder,
wherein before the inputting input text and a specified target identity identifier into an audio output model, the method comprises:
training a preliminary model of the identity recognition model by using a first training sample, to obtain a first identity recognition model;
training a preliminary model of the speech synthesis model by using a second training sample, to obtain a first speech synthesis model; and
training both the first identity recognition model and the first speech synthesis model by using a third training sample, to obtain the audio output model,
wherein the training a preliminary model of the speech synthesis model by using a second training sample, to obtain a first speech synthesis model comprises:
inputting the second training sample into the preliminary model of the speech synthesis model, wherein the second training sample comprises second sample text and second sample audio recorded by a speaker by the second sample text as content, and the preliminary model of the speech synthesis model comprises a feature encoding module, a variable adaptation module, and a feature decoding module, wherein the variable adaptation module comprises a duration prediction layer, a length adjustment layer, an energy prediction layer, and a pitch prediction layer;
acquiring a phoneme feature sequence corresponding to the second sample text and an audio feature sequence corresponding to second sample audio data, wherein the phoneme feature sequence corresponding to the second sample text is extracted by the feature encoding module, and the audio feature sequence corresponding to the second sample audio is pre-processed through a data preprocessing step;
performing duration prediction on the phoneme feature sequence corresponding to the second sample text by the duration prediction layer, and comparing a result of the duration prediction with the audio feature sequence corresponding to the second sample audio data, to obtain a first loss function;
inputting, into the duration prediction layer, the phoneme feature sequence corresponding to the second sample text and the audio feature sequence corresponding to the second sample audio data as first data, wherein, through the duration prediction layer, a low dimensional average value and a variance for the input first data are calculated to obtain second data, the second data is sampled from a latent variable space to obtain potential data, dimensionality augmentation is performed on the potential data to obtain third data, the first data is compared with the third data to obtain a second loss function, and probability distribution of the third data is compared with standard normal distribution to obtain a third loss function, wherein the first loss function, the second loss function, and the third loss function jointly adjust a parameter of the duration prediction layer based on a specific weight;

inputting data output from the duration prediction layer into the length adjustment layer, and performing alignment based on Gaussian distribution probability during a data stretching process;

inputting the audio feature sequence corresponding to the second sample audio data into the energy prediction layer and the pitch prediction layer respectively, to output an energy feature sequence and a pitch feature sequence;

superimposing data output from the length adjustment layer, the energy prediction layer, and the pitch prediction layer, and then inputting the data into the feature decoding module to output a Mel-frequency spectrum feature through the feature decoding module; and verifying a difference between the Mel-frequency spectrum feature output from the feature decoding module and the audio feature sequence corresponding to the second sample audio data through a loss function, and updating a model parameter of the preliminary model of the speech synthesis model to obtain the first speech synthesis model when the difference between the Mel-frequency spectrum feature output from the feature decoding module and the audio feature sequence corresponding to the second sample audio data is less than a second preset threshold through a plurality of iterations.

6. An electronic device, comprising a memory and a processor, wherein a computer program is stored in the memory, and the processor is configured to run the computer program to implement a synthetic audio output method, wherein the synthetic audio output method comprises:

inputting input text and a specified target identity identifier into an audio output model, wherein the target identity identifier uniquely corresponds to a target identity, the audio output model is a neural network model trained by using sample data, and the audio output model comprises an identity recognition model and a speech synthesis model;

extracting an identity feature sequence of the target identity by the identity recognition model, wherein the identity recognition model saves an identity mapping table during training, and the identity mapping table contains mapping between an identity identifier and the identity feature sequence;

extracting a phoneme feature sequence corresponding to the input text by an encoding layer of the speech synthesis model;

superimposing and inputting, the identity feature sequence of the target identity and the phoneme feature sequence corresponding to the input text, into a variable adapter of the speech synthesis model; and after duration prediction and alignment, energy prediction, and pitch prediction are performed on the phoneme feature sequence by the variable adapter, performing decoding by a decoding layer of the speech synthesis model and outputting a target Mel-frequency spectrum feature corresponding to the input text, wherein the target Mel-frequency spectrum feature conforms to a speaking style of the target identity; and inputting the target Mel-frequency spectrum feature into a vocoder to output synthetic audio conforming to the speaking style of the target identity through the vocoder, wherein before the inputting input text and a specified target identity identifier into an audio output model, the method comprises:

training a preliminary model of the identity recognition model by using a first training sample, to obtain a first identity recognition model;

training a preliminary model of the speech synthesis model by using a second training sample, to obtain a first speech synthesis model; and training both the first identity recognition model and the first speech synthesis model by using a third training sample, to obtain the audio output model, wherein the training a preliminary model of the speech synthesis model by using a second training sample, to obtain a first speech synthesis model comprises:

inputting the second training sample into the preliminary model of the speech synthesis model, wherein the second training sample comprises second sample text and second sample audio recorded by a speaker by the second sample text as content, and the preliminary model of the speech synthesis model comprises a feature encoding module, a variable adaptation module, and a feature decoding module, wherein the variable adaptation module comprises a duration prediction layer, a length adjustment layer, an energy prediction layer, and a pitch prediction layer;

acquiring a phoneme feature sequence corresponding to the second sample text and an audio feature sequence corresponding to second sample audio data, wherein the phoneme feature sequence corresponding to the second sample text is extracted by the feature encoding module, and the audio feature sequence corresponding to the second sample audio is pre-processed through a data preprocessing step;

performing duration prediction on the phoneme feature sequence corresponding to the second sample text by the duration prediction layer, and comparing a result of the duration prediction with the audio feature sequence corresponding to the second sample audio data, to obtain a first loss function;

inputting, into the duration prediction layer, the phoneme feature sequence corresponding to the second sample text and the audio feature sequence corresponding to the second sample audio data as first data, wherein, through the duration prediction layer, a low dimensional average value and a variance for the input first data are calculated to obtain second data, the second data is sampled from a latent variable space to obtain potential data, dimensionality augmentation is performed on the potential data to obtain third data, the first data is compared with the third data to obtain a second loss function, and probability distribution of the third data is compared with standard normal distribution to obtain a third loss function, wherein the first loss function, the second loss function, and the third loss function jointly adjust a parameter of the duration prediction layer based on a specific weight;

inputting data output from the duration prediction layer into the length adjustment layer, and performing alignment based on Gaussian distribution probability during a data stretching process;

inputting the audio feature sequence corresponding to the second sample audio data into the energy prediction layer and the pitch prediction layer respectively, to output an energy feature sequence and a pitch feature sequence;

superimposing data output from the length adjustment layer, the energy prediction layer, and the pitch prediction layer, and then inputting the data into the feature decoding module to output a Mel-frequency spectrum feature through the feature decoding module; and verifying a difference between the Mel-frequency spectrum feature output from the feature decoding module and the audio feature sequence corresponding to the second sample audio data through a loss function, and updating a model parameter of the preliminary model of the speech synthesis model to obtain the first speech synthesis model when the difference between the Mel-frequency spectrum feature output from the feature decoding module and the audio feature sequence corresponding to the second sample audio data is less than a second preset threshold through a plurality of iterations.

\* \* \* \* \*